United States Patent [19]

Beaver et al.

[11] 4,377,346
[45] Mar. 22, 1983

[54] THERMOSTATIC APPARATUS

[75] Inventors: Jack L. Beaver, Minneapolis; Jerry P. Schroeder, Minnetonka; John M. Whitney, Bloomington, all of Minn.

[73] Assignee: Honeywell Inc., Minneapolis, Minn.

[21] Appl. No.: 270,461

[22] Filed: Jun. 4, 1981

[51] Int. Cl.³ .................... G01K 15/00; G05D 23/00
[52] U.S. Cl. ........................................ 374/1; 374/185; 236/94; 338/135
[58] Field of Search ............... 374/1, 185; 340/599; 236/94; 338/135, 196

[56] References Cited

U.S. PATENT DOCUMENTS 2,921,285 1/1960 Neuendorffer et al. ............ 338/196
3,164,755 1/1965 Holt et al. ............................ 236/94
3,683,304 8/1972 Freeby ................................ 236/94

Primary Examiner—Donald O. Woodiel

Attorney, Agent, or Firm—Lockwood D. Burton; Mitchell J. Halista

[57] ABSTRACT

In an electronic thermostatic circuit, a resistive bridge network is employed to sense the level of the ambient temperature. The bridge includes three legs having fixed resistors and one leg having a temperature sensitive resistor as well as a serially connected adjustable potentiometer. The adjustable potentiometer is adjustable to provide a selected set point for the operation of the thermostat within a given range of temperatures. The adjustable potentiometer is provided with a shaft to which an adjusting knob having a pointer thereon is secured by means of a slip fastener. Calibration of the assembly is accomplished by turning the knob with its pointer pointed in a preferred direction then holding the knob while adjusting the shaft and the associated potentiometer until the bridge output corresponds with the value indicated by knob pointer.

10 Claims, 4 Drawing Figures

THERMOSTATIC APPARATUS

BACKGROUND OF THE INVENTION

The present invention relates to thermostatic apparatus. More particularly, it relates to a means and method for calibrating a thermostatic assembly.

In thermostatic apparatus for controlling the temperature in a residential or office type accommodations, especially those having a resistance type thermal sensor, an electrical potentiometer is incorporated into the circuit to allow a range of adjustments of temperature at which the thermostat is to control the ambient. In such circuits heretofore, it has been found necessary to include one or more trim potentiometers in order to allow a proper calibration of the thermostat to accomplish the required degree of accuracy of the selective adjustments. In such arrangements, the temperature selecting knob or set point pointer is keyed to the shaft of the temperature selecting potentiometer in a predetermined position relative to the shaft which approximates the desired control point relative to a preestablished dial. Since it is only an approximation of the desired control point, the auxiliary adjustable trim resistors are necessary to gain the required degree of accuracy. Such an arrangement is relatively costly both from the point of view of additional parts, the additional labor for the installation of those parts and the complexity of accomplishing the calibration.

SUMMARY OF THE INVENTION

It is, accordingly, an object of the present invention to provide an improved thermostat means.

It is another object of the present invention to provide improved calibrating means and methods for a thermostatic assembly.

In accomplishing these and other objects, there has been provided, in accordance with the present invention, an electronic thermostatic circuit wherein a bridge network is employed to sense the level of the ambient temperature. The bridge includes three legs having fixed resistors and one leg having a temperature sensitive element as well as a serially connected adjustable potentiometer. The adjustable potentiometer is adjustable to provide a selected set point for the operation of the thermostat within a given range of temperatures. The adjustable potentiometer is provided with a shaft to which an adjusting knob having a pointer thereon is secured by means of a slip fastener. Calibration of the assembly is accomplished by turning the knob until its pointer is pointed in a preferred direction, then holding the knob while adjusting the shaft and the associated potentiometer until the bridge output corresponds with the value indicated by knob pointer.

BRIEF DESCRIPTION OF THE DRAWING

A better understanding of the present invention may be had from the following detailed description when read in the light of the accompanying drawings in which.

DETAILED DESCRIPTION

Figure 1:
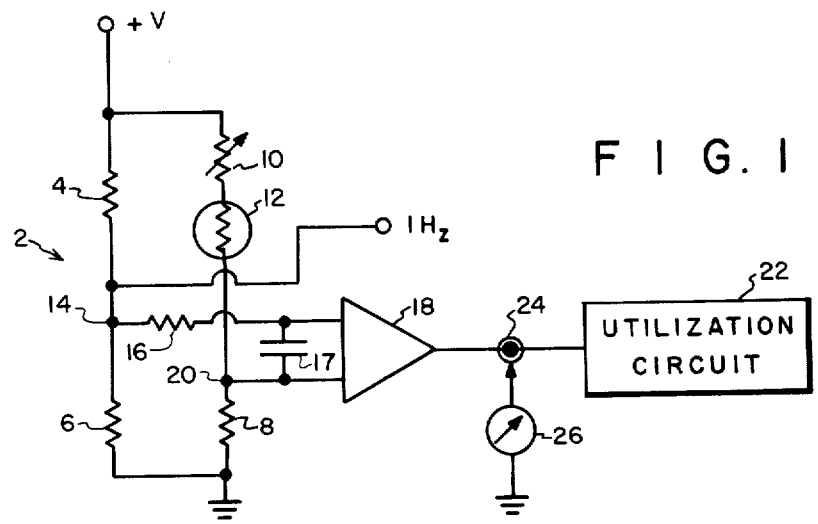
FIG. 1 is a schematic circuit diagram of a thermostatic circuit embodying the present invention.

Referring now to the drawings in greater detail, there is shown in FIG. 1 a schematic diagram for an electronic thermostat in which the temperature sensing apparatus includes a resistive bridge 2. The resistive bridge 2 includes three legs formed, respectively, of three fixed resistors 4, 6 and 8. The fourth leg includes a serial connection of a variable resistor or potentiometer 10 and a temperature sensitive resistor known as a thermistor 12. The junction between the fixed resistor 4 and the potentiometer 10 is connected to a positive voltage supply while the junction between the fixed resistors 6 and 8 is connected to ground or a potential common return. A junction 14 between the fixed resistors 4 and 6 is connected through a resistor 16 to one input terminal of a comparator 18. The junction 20 between the thermistor 12 and the fixed resistor 8 is connected directly to the second input terminal of the comparator 18.

The output of the comparator 18 is connected to the input of a utilization circuit 22. The utilization circuit 22, in the case of a thermostat, includes the signal responsive and the controlled circuits for the actuation of the heating or cooling apparatus. Suitable timing means may also be included in the utilization circuits. The output of the comparator 18 is also connected to a test point 24. Selectively connected to the test point 24 is a meter 26, the other side of which is connected to ground.

Before describing the operation of the circuit of FIG. 1 the mechanical structure of FIGS. 2 and 3 will be described.

Figure 2:
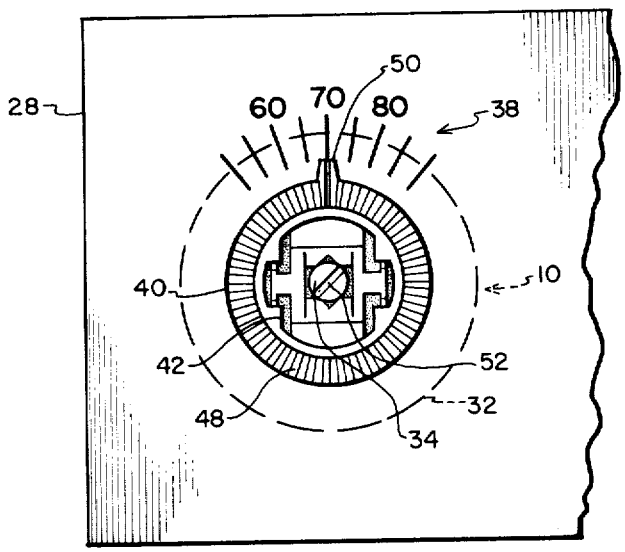
FIG. 2 is a fragmentary top view of a thermostatic apparatus embodying the present invention.
Figure 3:
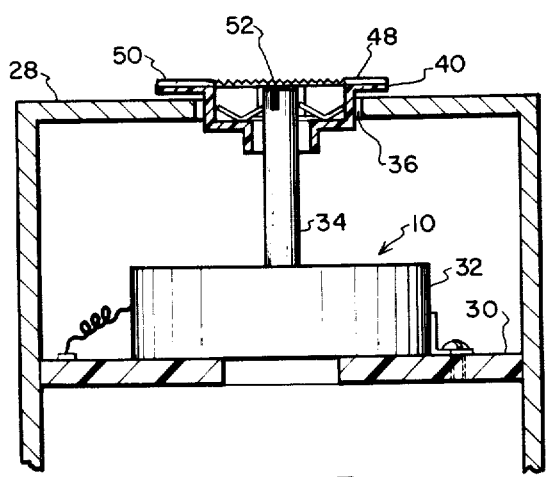
FIG. 3 is a cross sectional elevational view of the apparatus shown in FIG. 2.
Figure 4:
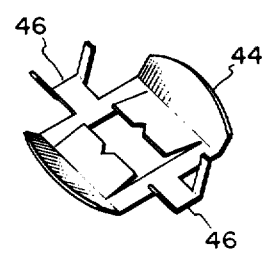
FIG. 4 is a perspective view of a fastener used in the present invention.

In FIGS. 2 and 3, there is shown a housing member 28. Mounted within the housing member 28 is a printed circuit board 30. Secured to and supported by the printed circuit board 30 is a potentiometer 10. The variable resistor portion of the potentiometer 10 is encased within the potentiometer housing 32. An operating shaft 34 extends from the face of the potentiometer housing 32 and protrudes thru an opening 36 in the face of the housing 28. On the outer face of the housing 28 and partially surrounding the opening 36 is an index scale 38 bearing numerical legends representing a range of temperatures. An adjusting knob 40 is positioned near the outer end of the shaft 34. The knob 40 has a cruciform recess 42 in the outer face thereof and surrounding the central opening through which the shaft extends. A sheet metal spring type push fastener 44, which is also basically cruciform in shape, is retained in the recess 42 and grips the end of the shaft 34 of the potentiometer 10. The fastener, or coupling means 44 as shown most clearly in FIG. 4, has a main body portion which includes the spring gripping elements which hold the shaft of the potentiometer with a firm but frictional slip grip. This main body portion is positioned in the principal part of the recess 42 and is retained there by a pair of lateral arms 46 with upturned ends. These lateral arms fit snugly into the transcept of the cruciform recess 42. The knob 40 has a knurled rim 48 and an integral pointer 50. The pointer 50 is arranged to cooperate with the scale 38 to provide a means for selecting a particular temperature for the controlled environment from the range of temperatures indicated on that scale.

In operation, in order to properly calibrate the thermostat in accordance with the present invention, the apparatus is thermally stabilized in an atmosphere which is controlled at a predetermined temperature such, for example, as 70 degrees F. A meter 26 such as a voltmeter is connected to the test point 24 at the output of the comparator 18. In an apparatus constructed in accordance with the present invention, there is provided a very low frequency reference signal which, in the exemplary embodiment was a 1 Hertz signal. Details of that exemplary embodiment are shown and claimed in a copending application of Arlon D. Kompelien, Ser. No. 173,512 filed on July 30, 1980. That signal is applied at the junction 14 of the resistive bridge 2 and averaged by the resistor 16 and a capacitor 17. With that averaged signal applied to the junction 14, the knob 40 is turned to the position whereat the pointer 50 coincides with the predetermined ambient temperature, i.e., 70 degrees. The upper end of the shaft 34 is provided with a screwdriver slot 52. The knob 40 is then firmly held in place with the pointer 50 coinciding with the indicated temperature, while the potentiometer shaft is turned, as by a screwdriver in cooperation with the slot 52, against the frictional engagement of the spring fastener 44 to such a position that the output signal from the comparator 18 changes state as indicated on the meter 26. At the point in the adjustment of the potentiometer 10 when the bridge 2 is balanced, the comparator 18 changes its output state, and the bridge circuit is calibrated to the ambient temperature. With the calibration of the thermostat to the selected temperature, the values of the several resistance elements in the circuit are such that the calibration is valid for all of the temperatures in the available range of temperatures to which the thermostat is to be subjected. While the apparatus is illustrated as including the 1H$_z$ signal inserted into the bridge circuit, that signal is primarily for other purposes, such as anticipation, as set forth in the copending application. With the anticipation, the thermostat could still be calibrated in accordance with the present invention.

The calibration of the thermostat in accordance with the present invention has been accomplished by the adjustment of only the temperature selecting main potentiometer 10. There are no other trimming or calibrating potentiometers required. Thus, there has been provided, in accordance with the present invention, an improved means and method for calibrating a thermostat which features improved simplicity and economy both in means and method.

The embodiments of the invention in which an exclusive property or privilege is claimed are defined as follows:

1. A thermostatic assembly comprising:
    an electronic temperature sensing circuit means including at least one temperature sensitive element and temperature selective set point potentiometer;
    a signal responsive device connected to be responsive to an output signal from said temperature sensing circuit means;
    said potentiometer having an adjustment shaft, a knob frictionally coupled to said shaft and having a pointer thereon for indicating a preferred set point for said thermostatic assembly; and
    means for adjusting said potentiometer while holding said knob stationary at a predetermined setpoint indicating position representative of ambient temperature to calibrate said thermostatic assembly at said ambient temperature.

2. A thermostatic assembly as set forth in claim 1 wherein said electronic temperature sensing circuit means comprises a resistive bridge.

3. A thermostatic assembly as set forth in claim 2 wherein said resistive bridge includes three arms each having fixed resistors therein and a fourth arm including said element as a temperature sensitive resistor and said potentiometer.

4. A thermostatic assembly as set forth in claim 3 wherein said signal responsive device comprises a comparator having input terminals connected across an output diagonal of said bridge.

5. A thermostatic assembly as set forth in claim 4 wherein said means for adjusting comprises a screwdriver slot in the end of said shaft and a meter connected to the output of said comparator to detect a change of state in the output of said comparator when said output from said bridge is balanced.

6. A thermostatic assembly as set forth in claim 5 wherein said means for adjusting includes a signal source connected across an input diagonal of said bridge.

7. A thermostatic assembly as set forth in claim 6 wherein said signal source is a source of a one Hz. signal and said comparator includes means for integrating an output signal from said bridge.

8. A thermostatic assembly as set forth in claim 1 wherein said potentiometer includes a set point scale arranged to cooperate with said pointer for indicating a preferred set point for said thermostatic assembly.

9. In a thermostatic assembly having a resistance bridge temperature measuring circuit including at least one temperature sensitive resistor and a temperature selecting potentiometer with an operating knob having a pointer and being frictionally coupled to the adjustment shaft of said potentiometer, and a signal comparator connected to the output diagonal of said bridge, a method of calibrating said thermostatic assembly comprising:
    exposing said assembly to a predetermined ambient temperature for a period of time sufficient to establish thermal equilibrium in said assembly;
    turning the pointer on said knob to indicate a position on an associated scale corresponding to said predetermined ambient temperature;
    adjusting said potentiometer by turning said shaft while holding said knob, against the frictional coupling, in said position, until the output signal from said comparator changes state.

10. A method as set forth in claim 9 and including the further step of applying an input signal across an input diagonal of said bridge.

* * * * *